United States Patent
Byun et al.

(10) Patent No.: US 8,956,753 B2
(45) Date of Patent: Feb. 17, 2015

(54) SECONDARY BATTERY AND SECONDARY BATTERY MODULE

(75) Inventors: Sang-Won Byun, Yongin-si (KR); Byung-Kyu Ahn, Yongin-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 726 days.

(21) Appl. No.: 12/929,678

(22) Filed: Feb. 8, 2011

(65) Prior Publication Data
US 2011/0244309 A1    Oct. 6, 2011

Related U.S. Application Data

(60) Provisional application No. 61/282,771, filed on Mar. 30, 2010.

(51) Int. Cl.
| | |
|---|---|
| *H01M 2/30* | (2006.01) |
| *H01M 10/02* | (2006.01) |
| *H01M 2/04* | (2006.01) |
| *H01M 10/04* | (2006.01) |

(52) U.S. Cl.
CPC .............. *H01M 2/30* (2013.01); *H01M 2/043* (2013.01); *H01M 10/0422* (2013.01)
USPC ............................ 429/158; 429/160; 429/179

(58) Field of Classification Search
None
See application file for complete search history.

(56) References Cited

U.S. PATENT DOCUMENTS

| | | | | |
|---|---|---|---|---|
| 5,853,914 | A * | 12/1998 | Kawakami | 429/66 |
| 2001/0046624 | A1* | 11/2001 | Goto et al. | 429/99 |
| 2002/0006542 | A1* | 1/2002 | Park et al. | 429/72 |
| 2002/0039283 | A1* | 4/2002 | Nakamura et al. | 361/736 |
| 2002/0136944 | A1 | 9/2002 | Nemoto et al. | |
| 2004/0023107 | A1* | 2/2004 | Nakanishi et al. | 429/161 |

FOREIGN PATENT DOCUMENTS

| | | |
|---|---|---|
| EP | 1244170 A2 | 9/2002 |
| WO | WO 2011/067025 | 6/2011 |

OTHER PUBLICATIONS

European Search Report in EP 11160223.1-2119, dated Jul. 25, 2011 (Byun, et al.).
Office Action dated Jun. 27, 2014 in corresponding Chinese Patent Application No. 201110069536.5.

* cited by examiner

*Primary Examiner* — Barbara Gilliam
*Assistant Examiner* — Adam A Arciero
(74) *Attorney, Agent, or Firm* — Lee & Morse, P.C.

(57) ABSTRACT

A secondary battery and a secondary battery module, the secondary battery including an electrode assembly, the electrode assembly including a positive electrode, a negative electrode, and a separator therebetween; a case for accommodating the electrode assembly; a cap plate for sealing the case; and at least one terminal unit, the at least one terminal unit including an electrode rivet electrically connected to one of the electrodes of the electrode assembly and formed of a first metallic material, a rivet terminal formed of a second metallic material, the second metallic material being different from the first metallic material, and a clad unit between the electrode rivet and the rivet terminal.

8 Claims, 7 Drawing Sheets

SECONDARY BATTERY AND SECONDARY BATTERY MODULE

CROSS-REFERENCE TO RELATED APPLICATION

The present application claims priority under 35 U.S.C. §119(e) to U.S. Provisional Application No. 61/282,771, filed on Mar. 30, 2010, and entitled: "Terminal Unit for Secondary Battery," which is incorporated herein by reference in its entirety.

BACKGROUND

1. Field

Embodiments relate to a secondary battery and a secondary battery module.

2. Description of the Related Art

Secondary batteries are rechargeable batteries, and are broadly used in portable electronic devices, e.g., cellular phones, notebook computers, and camcorders.

A secondary battery may be formed by inserting an electrode assembly, in which a positive electrode, a negative electrode, and a separator are wound in the form of a jelly roll, into a case through an opening of the case, and covering the opening by using a cap assembly. Current collecting plates may be coupled to respective ends of the electrode assembly and are electrically connected to a terminal unit of the cap assembly. Accordingly, if an external terminal is connected to the terminal unit, current generated in the electrode assembly may be provided to the external terminal via the current collecting plates and the terminal unit.

The terminal unit may include a positive electrode rivet and a negative electrode rivet connected to the current collecting plates. The terminal unit may also include rivet terminals bonded to the positive and negative electrode rivets in order to be connected to bus bars. Bonding between the positive electrode rivet or the negative electrode rivet and a rivet terminal, and between a rivet terminal and a bus bar may be performed by using a laser welding method.

SUMMARY

Embodiments are directed to a secondary battery and a secondary battery module, which represent advances over the related art.

At least one of the above and other features and advantages may be realized by providing a secondary battery including an electrode assembly, the electrode assembly including a positive electrode, a negative electrode, and a separator therebetween; a case for accommodating the electrode assembly; a cap plate for sealing the case; and at least one terminal unit, the at least one terminal unit including an electrode rivet electrically connected to one of the electrodes of the electrode assembly and formed of a first metallic material, a rivet terminal formed of a second metallic material, the second metallic material being different from the first metallic material, and a clad unit between the electrode rivet and the rivet terminal.

The clad unit may include an outer layer surrounding an inner layer, the outer layer being formed of the second metallic material and the inner layer being formed of the first metallic material.

The outer layer may be welded to the rivet terminal.

The electrode rivet may be engaged with the clad unit.

The electrode rivet may be welded to the inner layer of the clad unit.

The secondary battery may further include another terminal unit, the other terminal unit including another rivet terminal and another electrode rivet, wherein the other rivet terminal and the other electrode rivet are formed of a same metallic material.

The one terminal unit may have a polarity opposite to a polarity of the other terminal unit.

At least one of the above and other features and advantages may also be realized by providing a secondary battery module comprising a plurality of secondary batteries, at least one of the secondary batteries including an electrode assembly, the electrode assembly including a positive electrode, a negative electrode, and a separator therebetween; a case for accommodating the electrode assembly; a cap plate for sealing the case; and at least one terminal unit, the at least one terminal unit including an electrode rivet electrically connected to one of the electrodes of the electrode assembly and formed of a first metallic material, a rivet terminal formed of a second metallic material, the second metallic material being different from the first metallic material, and a clad unit between the electrode rivet and the rivet terminal.

The secondary battery module may further include a bus bar coupled to the rivet terminal of the at least one secondary battery and to an adjacent secondary battery, the bus bar being formed of the first metallic material.

At least one of the above and other features and advantages may also be realized by providing a secondary battery module, comprising a plurality of secondary batteries, at least one of the secondary batteries including an electrode assembly, the electrode assembly including a positive electrode, a negative electrode, and a separator therebetween; a case for accommodating the electrode assembly; a cap plate for sealing the case; at least one terminal unit, the at least one terminal unit including an electrode rivet electrically connected to one of the electrodes of the electrode assembly and formed of a first metallic material, a rivet terminal formed of the first metallic material; a bus bar coupled to the terminal unit of at least one of the secondary batteries and to an adjacent secondary battery and formed of a second metallic material, the second metallic material being different from the first metallic material; and a clad unit between the bus bar and the rivet terminal.

The clad unit may surround an outer edge of the bus bar.

The clad unit may include an outer layer surrounding an inner layer, the outer layer being formed of the first metallic material, and the inner layer being formed of the second metallic material.

The outer layer may be welded to the rivet terminal.

The inner layer may be welded to the bus bar.

The at least one secondary battery may further include another terminal unit, the other terminal unit including another rivet terminal, another electrode rivet, and another bus bar, wherein the other rivet terminal, the other electrode rivet, and the other bus bar are formed of a same metallic material.

The one terminal unit may have a polarity opposite to a polarity of the other terminal unit.

The electrode rivet may be engaged with the rivet terminal.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

Figure 1:
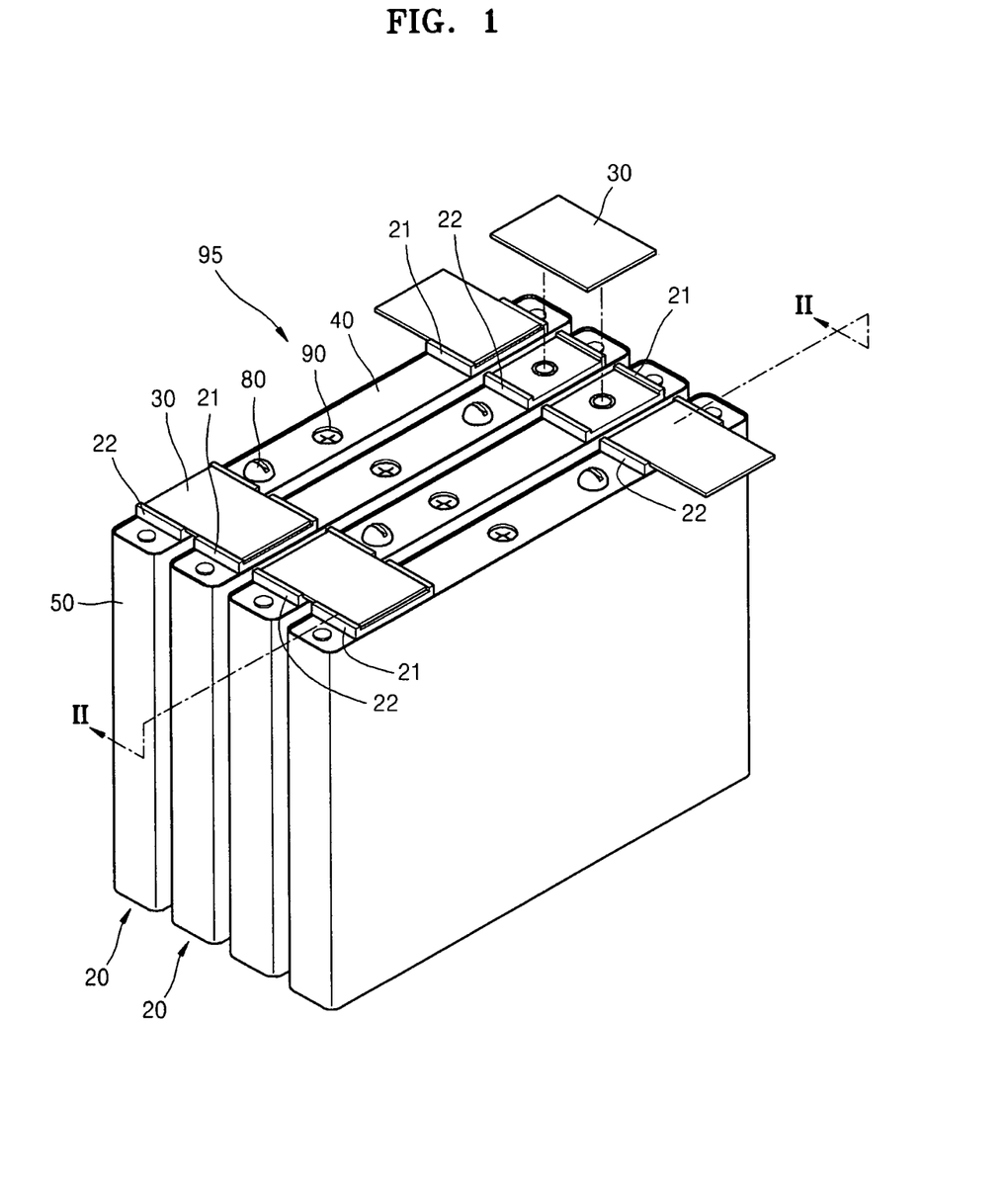
FIG. 1 illustrates a perspective view of a secondary battery module according to an embodiment.
Figure 2:
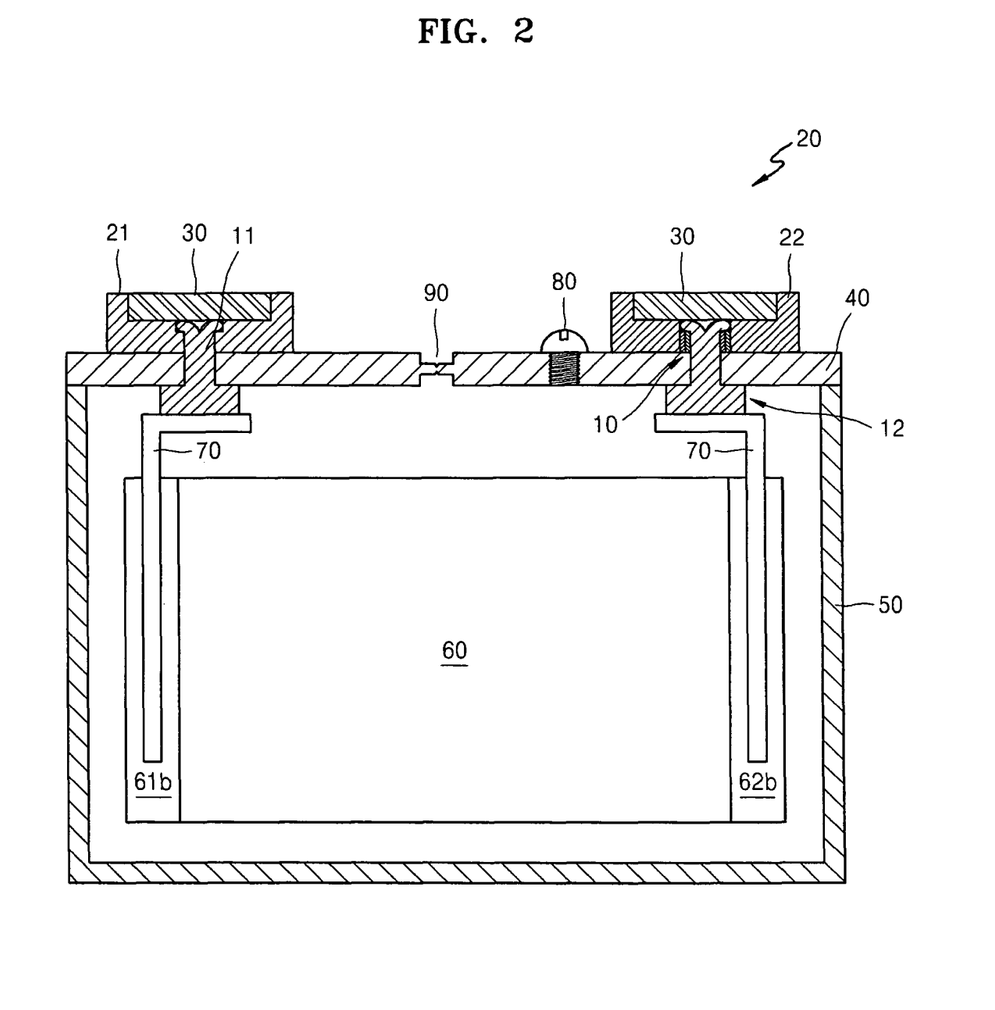
FIG. 2 illustrates a cross-sectional view of a secondary battery of the secondary battery module of FIG. 1.

FIG. 1 illustrates a perspective view of a secondary battery module according to an embodiment. FIG. 2 illustrates a cross-sectional view of a secondary battery of the secondary battery module of FIG. 1. As illustrated in FIGS. 1 and 2, the secondary battery 20 according to the present embodiment may include an electrode assembly 60 in which a positive electrode, a negative electrode, and a separator are wound in the form of a jelly roll, current collecting plates 70 coupled to respective ends of the electrode assembly 60, a case 50 for accommodating the electrode assembly 60 and the current collecting plates 70, and a cap assembly 40 coupled to an opening of the case 50. Accordingly, the electrode assembly 60 to which the current collecting plates 70 are coupled may be inserted into the case 50 through the opening and then covered by the cap assembly 40, thereby preparing a secondary battery 20 in which the electrode assembly 60 is safely accommodated.

The cap assembly 40 may include a sealing member 80 for sealing an inlet after an electrolyte is injected into the case 50 through the inlet. The cap assembly 40 may also include a safety vent 90 that is capable of being broken so as to discharge a gas when an internal pressure of the secondary battery 20 is excessively increased.

Figure 3:
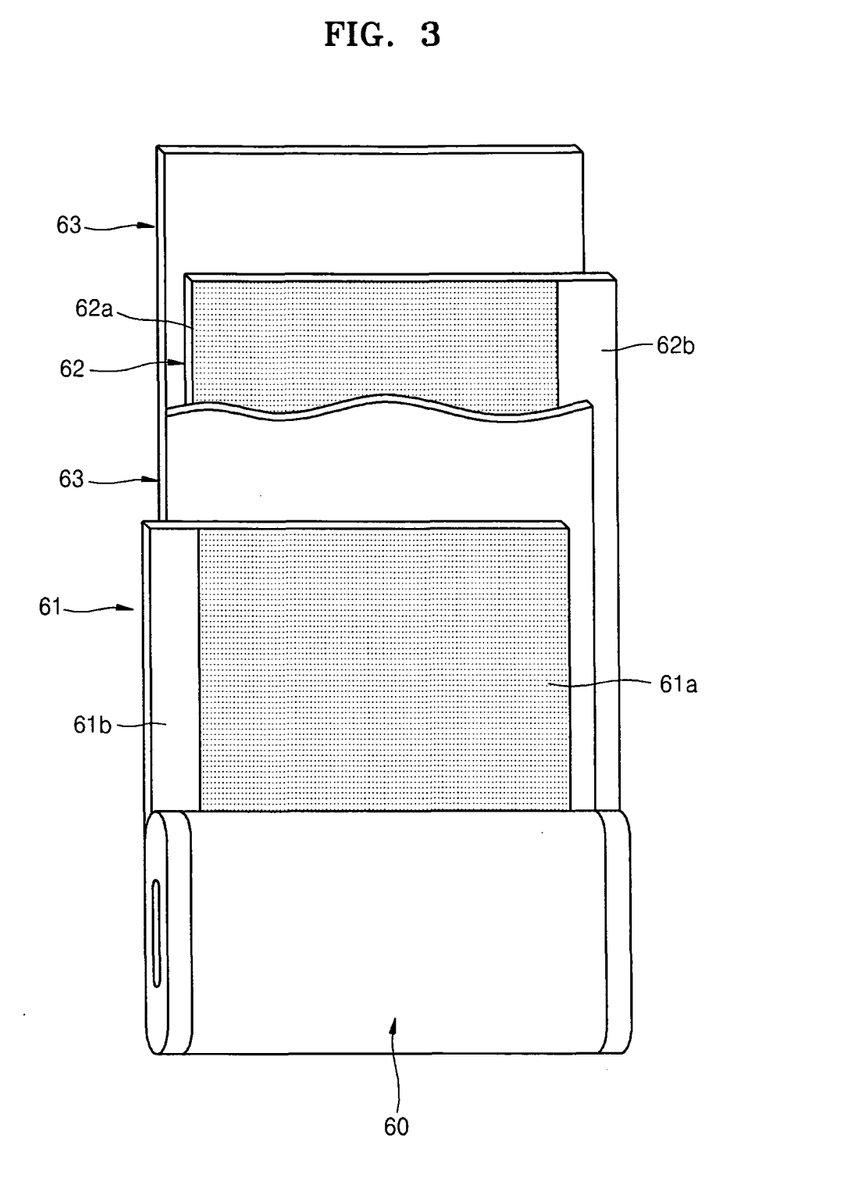
FIG. 3 illustrates a structural view of an electrode assembly of the secondary battery of FIG. 2.

FIG. 3 illustrates a structural view of an electrode assembly of the secondary battery of FIG. 2. As illustrated in FIG. 3, the electrode assembly 60 may be formed by alternately stacked a positive electrode 61, a separator 63, and a negative electrode 62 and then winding them in the form of a jelly roll. A positive electrode active material 61a may be coated on the positive electrode 61 and a negative electrode active material 62a may be coated on the negative electrode 62. Positive and negative electrode uncoated parts 61b and 62b on which an active material is not coated may be respectively formed on ends of the positive and negative electrodes 61 and 62. The positive electrode uncoated part 61b may be disposed at one end of the electrode assembly 60 and the negative electrode uncoated part 62b may be disposed at another end of the wound electrode assembly 60. For example, as illustrated in FIG. 3, the positive electrode uncoated part 61b may be disposed at a left end of the electrode assembly 60 and the negative electrode uncoated part 62b may be disposed at a right end of the electrode assembly 60. Accordingly, a left current collecting plate 70 illustrated in FIG. 2 may be electrically connected to the positive electrode 61 of the electrode assembly 60, and a right current collecting plate 70 may be electrically connected to the negative electrode 62 of the electrode assembly 60. Then, the left and right current collecting plates 70 may be respectively connected to a positive electrode rivet 11 and a negative electrode rivet 12 of a terminal unit.

The terminal unit may include the positive and negative electrode rivets 11 and 12, rivet terminals 21 and 22 respectively welded to the positive and negative electrode rivets 11 and 12, and bus bars 30 respectively welded to the rivet terminals 21 and 22 so as to form a serial or parallel connection structure with neighboring secondary batteries 20.

In the present embodiment, the positive electrode rivet 11, the rivet terminals 21 and 22, and the bus bars 30 may be formed of similar metals, e.g., aluminum materials, and the negative electrode rivet 12 may be formed of a dissimilar metal, e.g., a copper material. In this case, welding between the positive electrode rivet 11 and the rivet terminal 21 or between the rivet terminals 21 and 22 and the bus bars 31 and 32 may include similar metal welding. Accordingly, the similar metal welding may obtain a sufficient welding strength without any particular problem and thus may be preformed by using a suitable well-known method. However, since a bonding strength may be reduced if dissimilar metal welding is performed to bond the negative electrode rivet 12 and the rivet terminal 22 to each other, a clad metal 10, e.g., a dissimilar metal joint material, may be interposed therebetween such that similar metal welding may be performed at two sides of the clad metal 10.

Figure 4A:
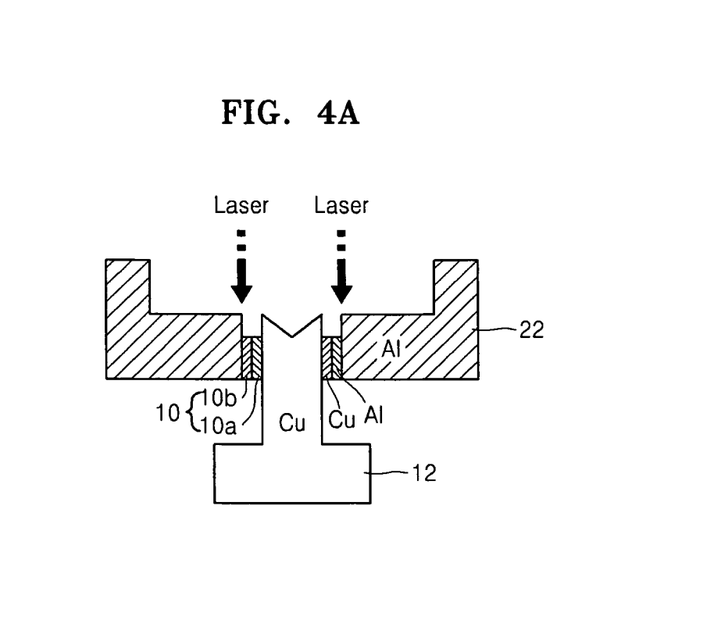
FIGS. 4A through 4C illustrate cross-sectional views of stages in a method of bonding a negative electrode rivet and a rivet terminal in the secondary battery of FIG. 2.
Figure 4B:
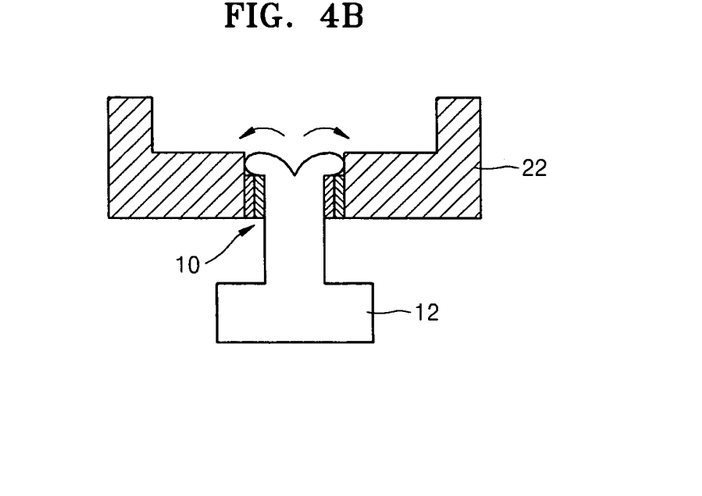
Figure 4C:
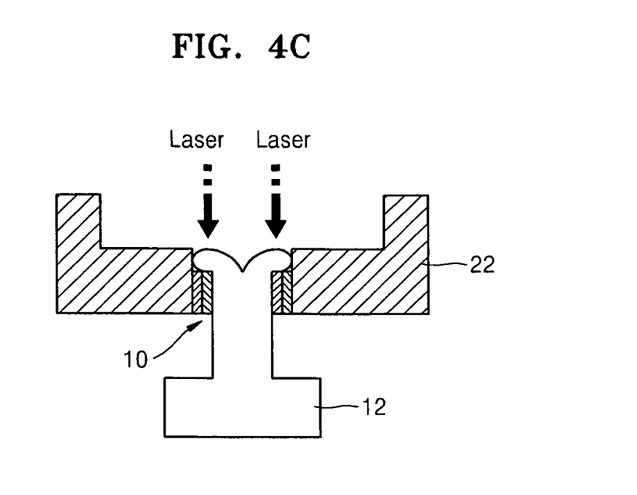

FIGS. 4A through 4C illustrate cross-sectional views of stages in a method of bonding a negative electrode rivet and a rivet terminal in the secondary battery of FIG. 2. Here, as illustrated in FIG. 4A, the clad metal 10 may be formed in a ring shape by, e.g., pressure-welding a copper member or inner layer 10a formed of a copper material as in the negative electrode rivet 12 and an aluminum member or outer layer 10b formed of an aluminum material as in the rivet terminal 22 so as to surround the negative electrode rivet 12. If welding is performed by inserting the clad metal 10 between the negative electrode rivet 12 and the rivet terminal 22 such that similar materials contact each other, the similar materials may be welded to each other and thus a sufficient bonding strength may be obtained.

The above-described terminal unit may be welded as described below.

Initially, as illustrated in FIG. 4A, the clad metal 10 may be inserted between the negative electrode rivet 12 and the rivet terminal 22, and the rivet terminal 22 and the clad metal 10 may be coupled to each other by, e.g., a laser welding method.

In this case, the clad metal 10 may be inserted so as to contact the similar materials of the negative electrode rivet 12 and the rivet terminal 22. Accordingly, similar materials, e.g., aluminum materials or copper materials, may be welded to each other.

Then, as illustrated in FIG. 4B, a front end of the negative electrode rivet 12 may be rivet-processed so as to closely contact upper portions of the clad metal 10. Thus, the clad metal 10 may be locked by the rivet-processed front end of the negative electrode rivet 12 and may not be separated therefrom.

After that, as illustrated in FIG. 4C, boundaries between the negative electrode rivet 12 and the clad metal 10 may be bonded by, e.g., a laser welding method. In this case, the welded portions of the negative electrode rivet 12 and the clad metal may be are similar metals, e.g., copper materials, and thus an appropriate bonding strength may be obtained. For example, the front end of the negative electrode rivet 12 may be welded to the inner layer 10a of the clad metal 10

Also, bonding between the rivet terminals 21 and 22 and the bus bars 30 may include similar metal welding between aluminum materials, and thus may be preformed by using a general laser welding method.

Accordingly, as described above, since similar metal welding may be performed when a terminal unit for a secondary battery is assembled, a very stable and solid bonding structure may be formed.

Figure 5:
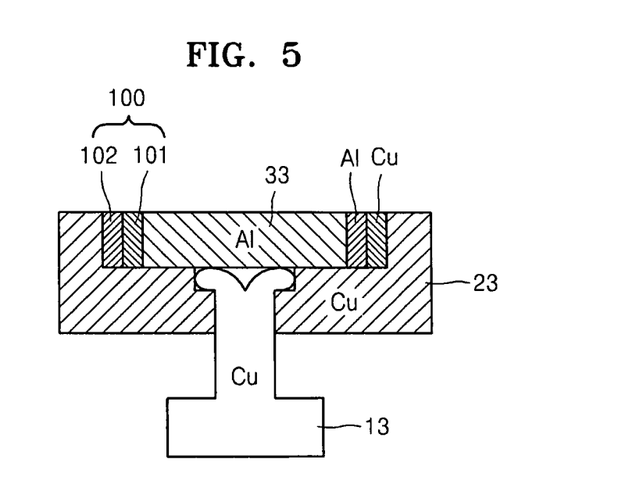
FIG. 5 illustrates a cross-sectional view of a terminal unit according to another embodiment.

FIG. 5 illustrates a cross-sectional view of a terminal unit according to another embodiment. In FIG. 5, a clad metal 100 may be inserted between a rivet terminal 23 and a bus bar 33 instead of between a negative electrode rivet 13 and the rivet terminal 23. For example, the rivet terminal 23 may be formed of a copper material, similar to the negative electrode rivet 13. In this case, welding between the negative electrode rivet 13 and the rivet terminal 23 is similar metal welding and thus drawbacks associated with dissimilar metal welding may be avoided. However, welding between the rivet terminal 23 formed of a copper material and the bus bar 33 formed of an aluminum material may include dissimilar metal welding. Accordingly, the clad metal 100 may be inserted between the rivet terminal 23 and the bus bar 33 such that similar metal welding may be performed. In this case, the clad metal 100 may include an aluminum member 101 at an inner side and a copper member 102 at an outer side so that similar metals contact the rivet terminal 23 and the bus bar 33, respectively. Accordingly, similar metal welding may be performed and thus a stable bonding strength may be obtained.

Figure 6:
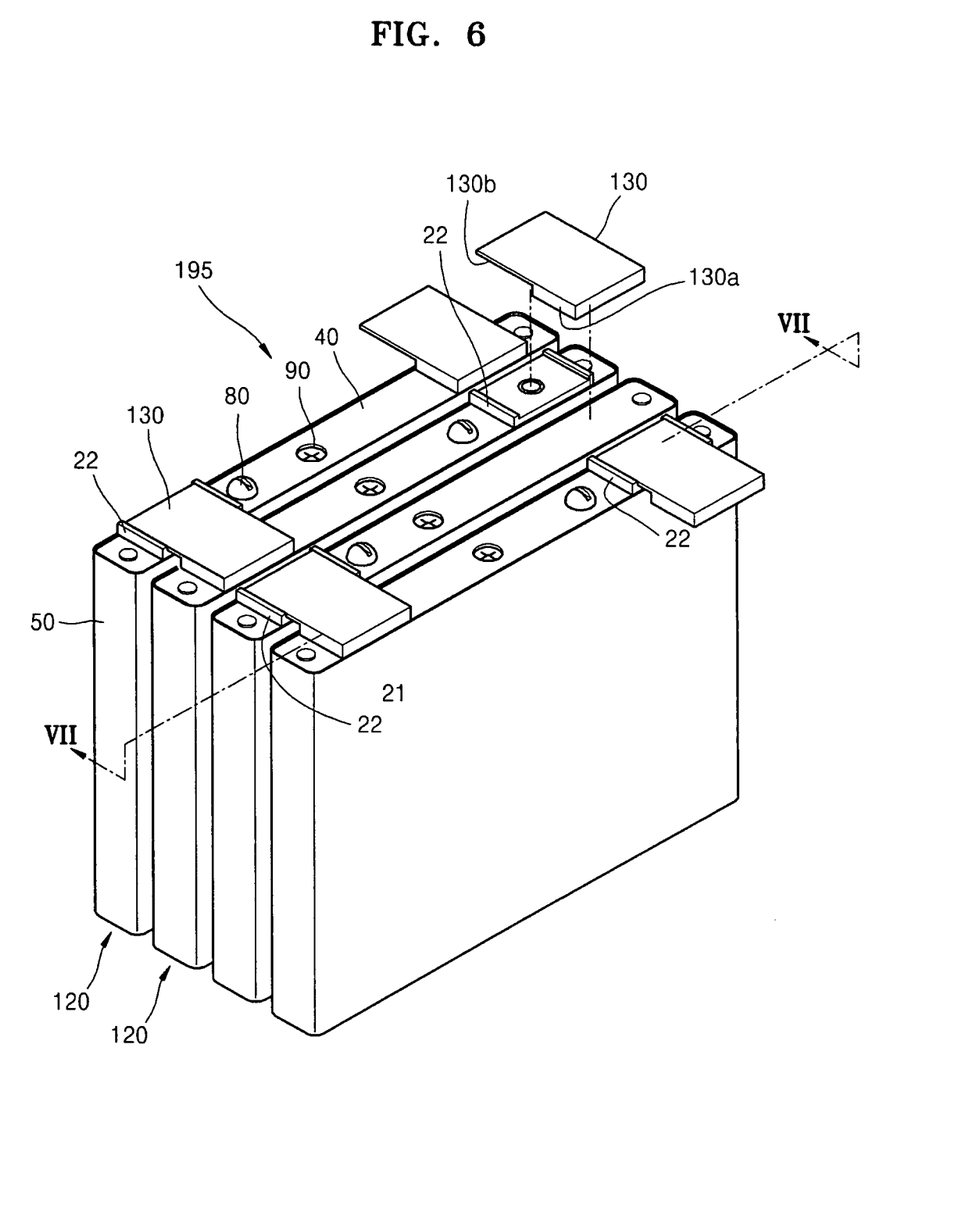
FIG. 6 illustrates a perspective view of a secondary battery module according to another embodiment.
Figure 7:
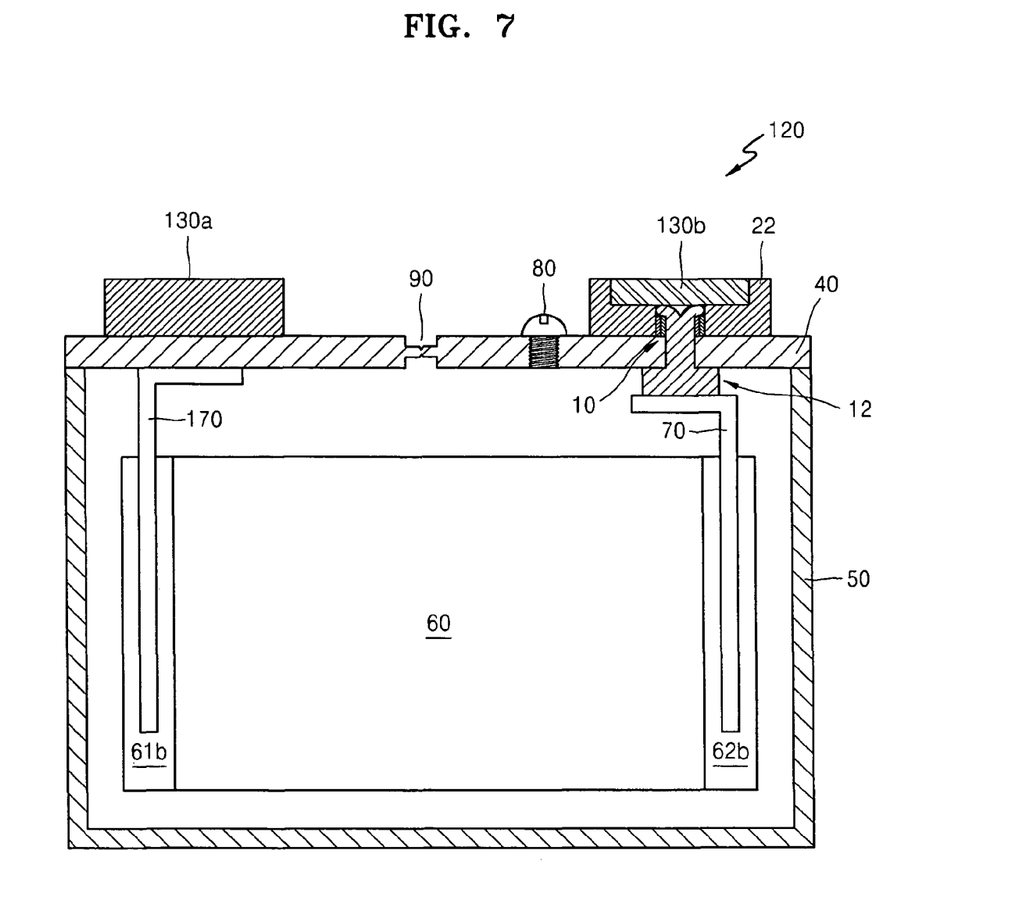
FIG. 7 illustrates a cross-sectional view of a secondary battery of the secondary battery module of FIG. 6.

FIG. 6 illustrates a perspective view of a secondary battery module according to another embodiment. FIG. 7 illustrates a cross-sectional view of a secondary battery of the secondary battery module of FIG. 6. A repeated description of elements similar to those of the previous embodiment will be omitted.

Referring to FIGS. 6 and 7, a single terminal 22 may be provided for coupling between a first current collecting plate 70 and a bus bar 130. A second current collecting plate 170 may be connected between the electrode assembly 60 and the cap assembly 40. For example, the second current collecting plate 170 may be connected to the positive electrode uncoated part 61b of the electrode assembly 60. In the secondary battery module of the present embodiment, the bus bar 130 may be directly connected to the cap assembly 40 of one of the secondary batteries 120 and connected to the terminal 22 of an adjacent secondary battery 120. For example, the bus bar 130 may include a first part 130a and a second part 130b. The first part 130a may have a thickness greater than a thickness of the second part 130b.

The first part 130a may be connected to the cap assembly 40 of the one secondary battery 120 and the second part 130b may be connected to the terminal 22 of the adjacent secondary battery 120 to connect the secondary batteries 120 in series or in parallel. Accordingly, due to the difference in height between the first part 130a and the second part 130b, a top surface of the bus bar 130 may have a flat, uniform surface. In an implementation, the cap assembly 40 of the one secondary battery 120 may have a polarity opposite to the terminal 22 of the adjacent secondary battery 120.

Meanwhile, although the above descriptions are provided with respect to a dissimilar metal welding between a rivet terminal and a negative electrode rivet from among electrode rivets, in some cases, the dissimilar metal welding may occur when welding a rivet terminal and a positive electrode rivet. Accordingly, regardless of the type of electrode rivet, when dissimilar metal welding is required between an electrode rivet and a rivet terminal, or between a rivet terminal and a bus bar, if a clad metal, e.g., a dissimilar metal joint material, is inserted therebetween, a stable and solid bonding structure may be obtained.

In this regard, since the positive and negative electrode rivets are generally formed of dissimilar metals, if the rivet terminals are formed using one metal, absent the embodiments discussed herein, dissimilar metal welding may be performed between the positive electrode rivet or the negative electrode rivet and a rivet terminal. Accordingly, a reduction in weldability may occur and a low bonding strength may ensue. If, instead, the rivet terminals are formed of dissimilar metals corresponding to the metals for forming the positive and negative electrode rivets, weldability between the positive and negative electrode rivets and the rivet terminals may be improved. Yet, such an approach fails to address the welds between at least one of the rivet terminals and a corresponding bus bar. Hence, a reduction in weldability also ensues in that context. The embodiments disclosed herein circumvent such a reduction in weldability caused when dissimilar metal welding is performed in a terminal unit.

As a result, according the above-described embodiments, bonding may be performed between an electrode rivet and a rivet terminal, or between a rivet terminal and a bus bar by performing similar metal welding, and thus a solid bonding strength may be ensured.

The embodiments provide a secondary battery including a terminal unit capable of preventing a reduction in weldability.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A secondary battery, comprising:
   an electrode assembly, the electrode assembly including a positive electrode, a negative electrode, and a separator therebetween;
   a case for accommodating the electrode assembly;
   a cap plate for sealing the case; and
   at least one terminal unit, the at least one terminal unit including:
   an electrode rivet electrically connected to one of the electrodes of the electrode assembly and formed of a first metallic material,
   a rivet terminal at an exterior of the cap plate and including a hole in which the electrode rivet is inserted, the rivet terminal being formed of a second metallic material, the second metallic material being different from the first metallic material, and
   a clad unit between the electrode rivet and the rivet terminal, wherein:
   the clad unit is disposed in the hole and includes an outer layer surrounding an inner layer, the outer layer being in contact with an inner surface of the hole and being formed of the second metallic material, the inner layer being in contact with the electrode rivet and being formed of the first metallic material, and the electrode rivet is engaged with the clad unit.

2. The secondary battery as claimed in claim 1, wherein the outer layer is welded to the rivet terminal.

3. The secondary battery as claimed in claim 1, wherein the electrode rivet is welded to the inner layer of the clad unit.

4. The secondary battery as claimed in claim 1, further comprising another terminal unit, the other terminal unit including another rivet terminal and another electrode rivet, wherein the other rivet terminal and the other electrode rivet are formed of a same metallic material.

5. The secondary battery as claimed in claim 4, wherein the one terminal unit has a polarity opposite to a polarity of the other terminal unit.

6. The secondary battery as claimed in claim 1, wherein the first metallic material includes copper and the second metallic material includes aluminum.

7. A secondary battery module comprising a plurality of secondary batteries, at least one of the secondary batteries comprising:

an electrode assembly, the electrode assembly including a positive electrode, a negative electrode, and a separator therebetween;

a case for accommodating the electrode assembly;

a cap plate for sealing the case; and at least one terminal unit, the at least one terminal unit including:

an electrode rivet electrically connected to one of the electrodes of the electrode assembly and formed of a first metallic material, a rivet terminal at an exterior of the cap plate and including a hole in which the electrode rivet is inserted, the rivet terminal being formed of a second metallic material, the second metallic material being different from the first metallic material, and a clad unit between the electrode rivet and the rivet terminal, wherein:

the clad unit is disposed in the hole and includes an outer layer surrounding an inner layer, the outer layer being in contact with an inner surface of the hole and being formed of the second metallic material, the inner layer being in contact with the electrode rivet and being formed of the first metallic material, and the electrode rivet is engaged with the clad unit.

8. The secondary battery module as claimed in claim 7, further comprising a bus bar coupled to the rivet terminal of the at least one secondary battery and to an adjacent secondary battery, the bus bar being formed of the first metallic material.

* * * * *